United States Patent
Haas et al.

(10) Patent No.: US 7,162,809 B2
(45) Date of Patent: Jan. 16, 2007

(54) POWER SAW GUIDE

(75) Inventors: Jon A. Haas, Oconomowoc, WI (US); Andrew D. Ketch, Cobble Hill (CA)

(73) Assignee: Random Innovation, Cobble Hill (CA)

( * ) Notice: Subject to any disclaimer, the term of this patent is extended or adjusted under 35 U.S.C. 154(b) by 0 days.

(21) Appl. No.: 11/198,014

(22) Filed: Aug. 5, 2005

(65) Prior Publication Data

US 2006/0026855 A1     Feb. 9, 2006

(51) Int. Cl.
*B23Q 17/22* (2006.01)

(52) U.S. Cl. ............... 33/640; 33/638; 33/DIG. 21; 83/520

(58) Field of Classification Search .............. 33/42, 33/628, 638, 640, DIG. 21; 30/373; 83/520
See application file for complete search history.

(56) References Cited

U.S. PATENT DOCUMENTS

| | | | |
|---|---|---|---|
| 2,926,706 A | 3/1960 | Hopla | 143/6 |
| 4,054,077 A | 10/1977 | Gram | 83/745 |
| 5,035,061 A * | 7/1991 | Bradbury et al. | 33/42 |
| 5,042,542 A * | 8/1991 | Purviance | 33/628 |
| 5,271,159 A | 12/1993 | Chen et al. | 33/403 |
| 5,348,276 A | 9/1994 | Blacker | 269/88 |
| 5,461,790 A | 10/1995 | Olstowski | 30/391 |
| 5,472,029 A | 12/1995 | Ketch | 144/371 |
| 5,675,899 A | 10/1997 | Webb | 30/390 |
| 5,699,705 A | 12/1997 | Sibbet | 83/13 |
| D400,772 S | 11/1998 | Gallagher et al. | D8/66 |
| 5,862,727 A | 1/1999 | Kelly | 83/13 |
| 5,904,867 A | 5/1999 | Herke | 219/121.6 |
| 5,924,207 A | 7/1999 | Price et al. | 30/376 |
| 5,949,810 A | 9/1999 | Star et al. | 372/108 |
| 6,377,839 B1 | 4/2002 | Kalfas et al. | 600/426 |
| 6,584,695 B1 | 7/2003 | Chang | 30/391 |
| 6,616,295 B1 | 9/2003 | Sako et al. | 362/119 |
| 6,622,997 B1 | 9/2003 | Emerson | 269/166 |
| 2003/0192192 A1 * | 10/2003 | Kirkland | 33/640 |
| 2005/0028395 A1 * | 2/2005 | Liu et al. | 33/640 |
| 2006/0101969 A1 * | 5/2006 | Garcia et al. | 83/520 |

* cited by examiner

*Primary Examiner*—G. Bradley Bennett
(74) *Attorney, Agent, or Firm*—Philip G. Meyers

(57) ABSTRACT

The invention is directed to a guide for a power saw or router of the type having a blade and a housing wider than the blade which directly overlies the blade during the cutting operation. The guide includes a guide bar having a straight outer edge configured for guiding a peripheral edge of the saw housing and a gauge device. The gauge device includes an elongated holder and a light beam projector mounted on the holder for projecting a beam of light at an angle relative to a lengthwise axis of the holder. In this respect, the light beam projector is mounted on the holder for projecting a beam of light at a right angle relative to a lengthwise axis of the holder such that the beam of light is parallel to the straight outer edge of the guide bar. The light beam projector is preferably a laser.

6 Claims, 2 Drawing Sheets

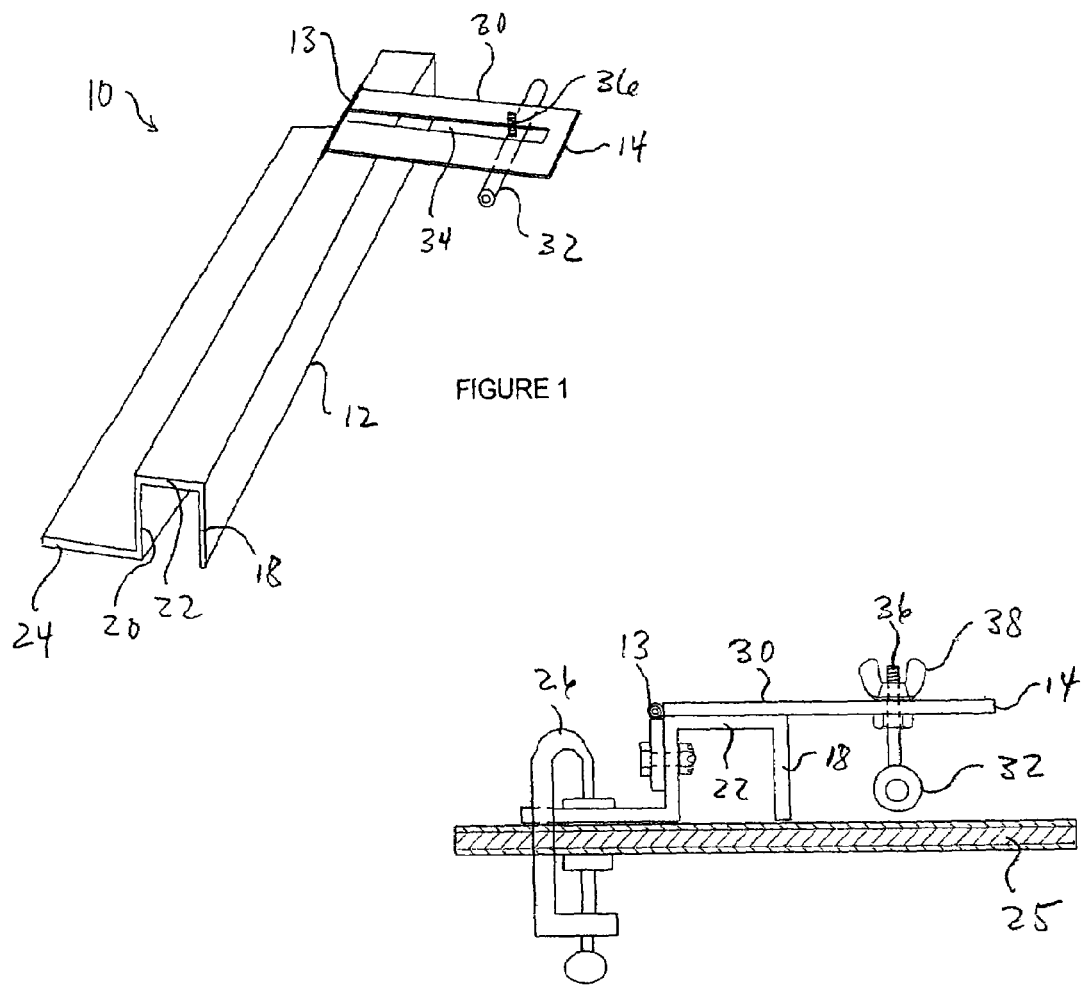
FIGURE 1
FIGURE 2
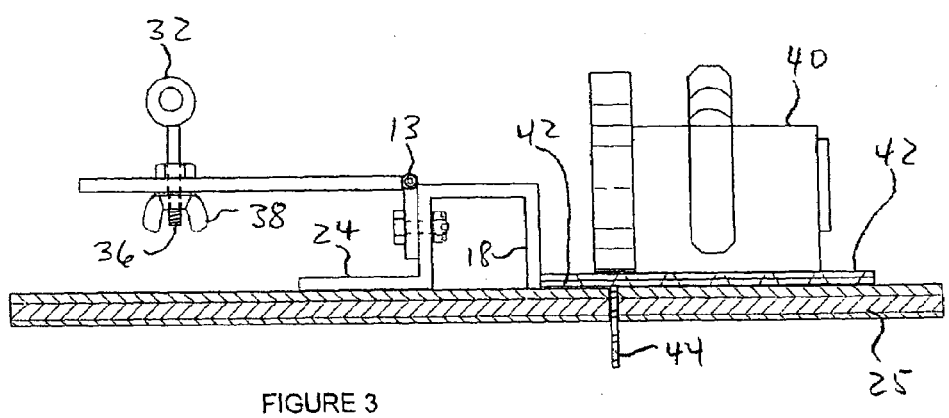
FIGURE 3

POWER SAW GUIDE

TECHNICAL FIELD

The invention relates to guides for power saws, and in particular a guide for a power saw or router of the type having a blade and a housing wider than the blade which directly overlies the blade during cutting.

BACKGROUND OF THE INVENTION

Guiding a hand held circular power saw when cutting sheets of plywood, trimming doors and similar tasks to accomplish a smooth accurate cut can be a daunting task for several reasons. First, it is difficult accurately guide a circular saw by hand when making a long cut, such as across a typical 4'×8' sheet of plywood. Second, the saw housing overlies the blade making it virtually impossible to view the blade as the cut is made. While circular saws typically include a sight guide or notch which can be aligned with a cut line scribed with a pencil or chalk line, the sight guide does not actually guide the saw, but rather simply gives the operator an indication of the blade position relative to the cut line. Further compounding the problem is that circular saws made by different manufacturers may have different configurations. Similar problems are encountered when using hand routers.

Another guide for a circular saw is disclosed in U.S. Pat. No. 5,472,029 to Ketch, issued Dec. 5, 1995 comprises a guide bar having a straight outer edge configured for guiding a peripheral guide surface of the saw housing, a gauge bar having a straight outer edge, and a hinge pivotally connecting the gauge bar to the guide bar. The gauge bar of this device is effective but large, making the device more expensive to fabricate. Saw guides are disclosed in U.S. Pat. No. 4,054,077, issued Oct. 18, 1977, entitled "Guide For Hand Held Power Saws," U.S. Pat. No. 2,926,706, issued on Mar. 1, 1960, entitled "Cross-Cut and Rip Guide Device for Portable Power Saws," and U.S. Pat. No. 5,271,159, issued on Dec. 21, 1993, entitled "Circular Saw Guide." These devices require the guide to be aligned in a spaced relation to the contemplated cut to allow for the distance between the saw and the edge of the flange on the saw.

SUMMARY OF THE INVENTION

The invention is directed to a guide for a power saw or router of the type having a blade and a housing wider than the blade which directly overlies the blade during the cutting operation. The guide includes a guide bar having a straight outer edge configured for guiding a peripheral edge of the saw housing and a gauge device. The gauge device includes an elongated holder and a light beam projector mounted on the holder for projecting a beam of light at an angle relative to a lengthwise axis of the holder. In this respect, the light beam projector is mounted on the holder for projecting a beam of light at a right angle relative to a lengthwise axis of the holder such that the beam of light is parallel to the straight outer edge of the guide bar. The light beam projector is preferably a laser.

The holder is connected to the guide bar with a hinge so that the holder can be swung manually from a position in which the beam projector projects a beam of light along a surface of a flat workpiece to a position where the hinge and gauge device are clear of the straight outer edge of the guide bar. With the hinge and gauge device swung clear of the outer edge of the guide bar, the saw or router can move without obstruction along the straight outer edge of the guide bar. Means are provided to permit adjustment of the spacing between the guide bar and the beam projector.

In another aspect, the invention provides a set of tools for guiding a power saw or router of the type having a blade and a housing wider than the blade which directly overlies the blade. The set includes a saw guide with a guide bar having a straight outer edge configured for guiding a peripheral edge of the saw housing, and means for releasably clamping the guide bar to a workpiece to be sawed. The tool set also includes a gauge device including a measuring tool having a straight side and a light beam projector mounted on the measuring tool at a position spaced from the straight side for projecting a beam of light parallel to the straight side. The gauge device can be positioned with the straight side against the straight outer edge of the guide bar in a position in which the beam projector projects a beam of light along a surface of a flat workpiece. The light beam projector is a preferably a laser and has means for adjusting the spacing between the beam projector and the straight side of the measuring tool.

BRIEF DESCRIPTION OF THE DRAWINGS

FIG. 1 is a perspective view of a saw guide according to the invention;

FIG. 2 is an end view of the saw guide of FIG. 1 with a light beam emitting device in a deployed position;

FIG. 3 is an end view of the saw guide of FIGS. 1 and 2 with the light emitting device retracted;

DETAILED DESCRIPTION OF THE INVENTION

Figure 4:
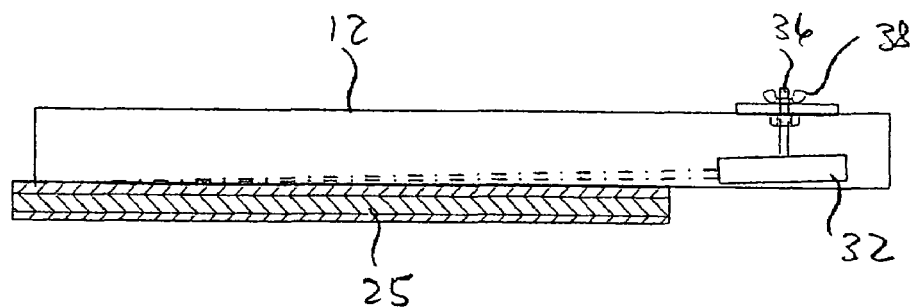
FIG. 4 is a partial side view of the saw guide of FIGS. 1 and 2.

Referring to FIGS. 1–3 a saw guide assembly 10 according to the invention includes a guide bar 12 and a gauge device 14 connected to guide bar 12 with a hinge 13. Guide bar 12 includes vertical front and back walls 18, 20 interconnected with a top wall 22. A horizontal flange 24 extending from the lower edge of back wall 20 provides a means of securing the saw guide assembly to a work piece such as a sheet of plywood 25. Guide bar 12 may thus be secured to the work piece with a clamp such a C-clamp 26, a spring clamp or an adjustable spring loaded wench such as vise grips. A clamping device such as disclosed in U.S. Pat. No. 5,348,276, issued Sep. 20, 1994 to Blacker, the disclosure of which is hereby incorporated by reference, may also be employed to secure guide bar 12 to the work piece.

Gauge device 14 includes an elongated arm or holder 30 and a light beam projector 32 mounted on arm 30 to project a beam of light perpendicular to the longitudinal axis of the arm. Preferably, light beam projector 32 is a low power, battery operated laser so that divergence of the light beam will be minimal. Arm 30 is provided with a slot 34 for receiving a bolt or screw 36 attached to light beam projector 32 so that projector 32 may be secured to arm 30 with a wing nut 38. Projector 32 may be moved along the length of arm 30 by loosening wing nut 38, sliding projector 32 to the desired location along arm 30 and re-tightening wing nut 38. Further, as shown in FIG. 4, projector 32 is mounted on arm 30 at an angle relative to the longitudinal axis of arm 30 such that the beam of light emitted from the projector angles slightly downward so as to intersect the work piece creating a visible line on the work piece.

In order to position the guide bar for the cut, the operator adjusts the position of beam projector 32 such that the distance between the surface of vertical guide wall 18 and the beam emitted from the projector is the same as the distance between the outside edge of the flange 42 of saw 40 and the edge of the saw blade 44. If the distance between the outside edge of the saw flange 42 and the edge of the saw blade 44 is known, a ruler or tape measure may be utilized to position projector 32 the same distance from vertical guide wall 18. One simple method of positioning beam projector 32 along arm 30, is to make a test cut. Guide bar 12 is clamped to a test work piece with gauge assembly 14 in the retracted position as illustrated in FIG. 3. The operator positions saw 40 as shown in FIG. 3, with the edge of saw flange 42 abutted against vertical wall 18 of guide 10 and makes a test cut into the work piece. Gauge assembly 14 is then deployed as illustrated in FIG. 2, and projector 32 is adjusted along the length of arm 30 until the beam emitted by the projector is aligned with the cut edge of the work piece. Projector 32 is then clamped into position with wing nut 38.

After projector 32 has been adjusted for the particular saw, to use guide assembly 10, the operator scribes one or more cut marks on the work piece at the desired cut location. The operator then deploys light beam projector by pivoting arm 30 over the top of guide bar 12 to the position shown in FIG. 2. The position of guide bar 12 on the work piece is adjusted until the beam from projector 32 is aligned with the scribe mark or marks. Guide bar 12 is then clamped in position and gauge assembly 14 is retracted by pivoting arm 30 away from the guide bar so that vertical front wall 18 may be used a guide for the saw. The operator then cuts the work piece, holding the edge of the saw flange 42 firmly against vertical wall 18 as the cut is made to achieve a straight, smooth cut.

Figure 5:
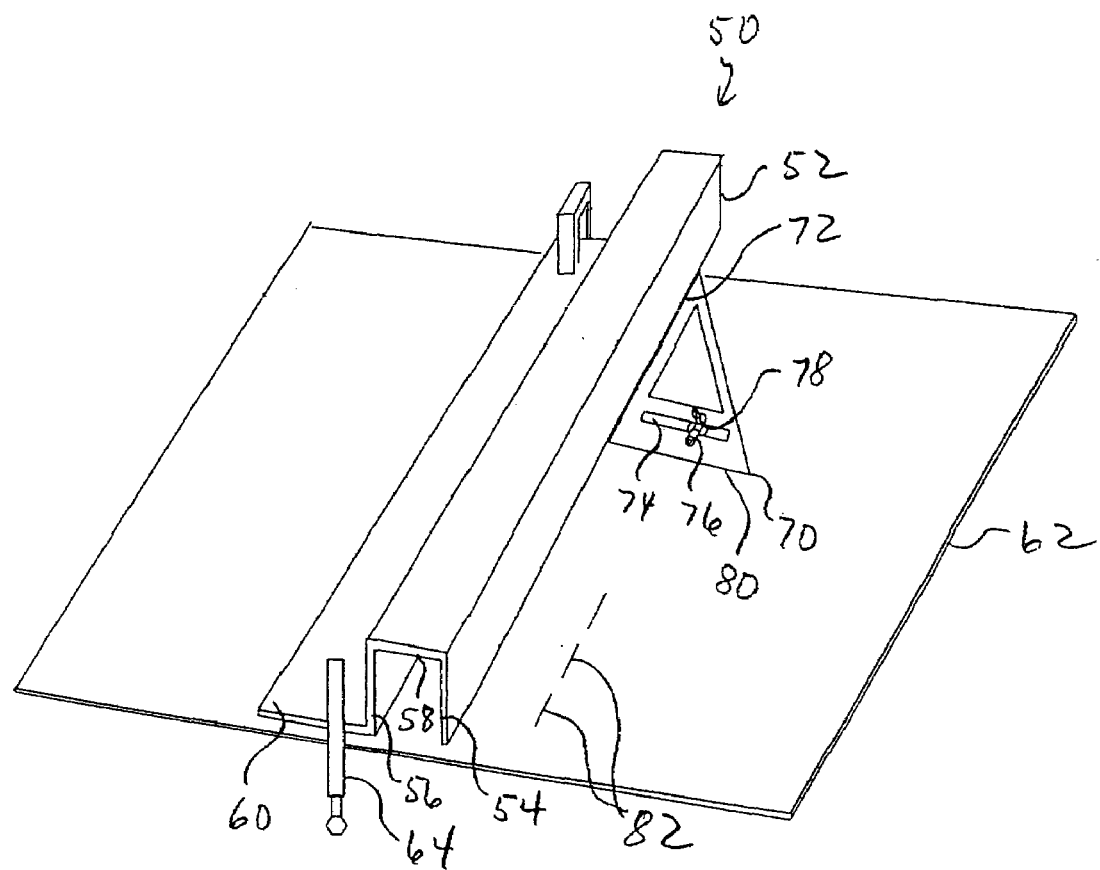
FIG. 5 is a perspective view of a tool set for guiding a saw or router according to the invention.

Turning to FIG. 5, in an alternate embodiment of the invention, a tool set 50 for guiding a power saw or router includes a saw guide comprising a guide bar 52 with vertical side walls 54, 56 interconnected with a top wall 58 and a flange 60 extending horizontally from the lower end of side wall 56. Flange 60 provides a means of securing guide bar 52 to a work piece 62 by means of clamps 64 such that side wall 54 may be used as a guide for a power saw or router.

A gauge device for use with guide bar 52 comprises a triangular template 70 with an elongated straight side 72, a slot 74 extending perpendicular to side 72 and a light beam projector 76 mounted for movement along slot 74. Light beam projector 76 is secured in slot 74 with a bracket 78 which may be loosened to position bracket 78 and projector 76 at the desired location in slot 74. Preferably, template 70 is inscribed with a distance scale along near side 80 to aid in positioning bracket 78 and projector 76 at the desired location relative to straight side 72. Preferably, light beam projector 76 comprises a laser and is slightly angled so as to project a beam of light along the surface of workpiece 62 so as to intersect the surface of the work piece creating a visible line in the same manner as illustrated and described in connection with FIG. 4.

To employ tool set 50 in connection with, for example a circular saw, the operator first positions and secures projector 76 in slot 74 at a distance from elongate side 72 that is equal to the distance between the outside edge of the circular saw flange and circular saw blade. The distance between the circular saw flange and the saw blade may be measured directly or determined by making a test cut in work piece 62 and marking the position of the edge of the saw flange with the blade in the cut. The operator then positions template 70 such that the beam from projector 76 is aligned with scribe marks 82 that represent the desired cut line across work piece 62. Guide bar 52 is then positioned across work piece 62 with side wall 54 abutting elongate side 72 of template 70 and clamped into position. The operator then proceeds to cut the work piece 62 holding the outside edge of saw flange firmly against sidewall 54 to guide the saw along the cut line defined by scribe marks 82.

While certain embodiments of the invention have been illustrated for the purpose of this disclosure, numerous changes in the method and apparatus of the invention presented herein may be made by those skilled in the art, such changes being embodied within the scope and spirit of the present invention as defined in the appended claims.

The invention claimed is:

1. A guide for a power saw or router of the type having a blade and a housing wider than the blade which directly overlies the blade during cutting, comprising:
   a guide bar having a straight outer edge configured for guiding a peripheral edge of the saw housing;
   a gauge device including an elongated holder and a light beam projector mounted on the holder for projecting a beam of light at an angle relative to a lengthwise axis of the holder;
   a hinge pivotally connecting the holder to the guide bar so that the holder can be swung manually from a position in which the beam projector projects a beam of light along a surface of a flat workpiece to a position where the hinge and gauge device are clear of the straight outer edge of the guide bar so that the saw or router can move without obstruction along the straight outer edge of the guide bar; and
   means for adjusting the spacing between the guide bar and the beam projector.

2. The guide of claim 1, wherein the light beam projector is mounted on the holder for projecting a beam of light at a right angle relative to a lengthwise axis of the holder, which beam of light is parallel to the straight outer edge of the guide bar.

3. The guide of claim 1, wherein the light beam projector is a laser.

4. A set of tools for guiding a power saw or router of the type having a blade and a housing wider than the blade which directly overlies the blade during cutting, comprising:
   a saw guide including a guide bar having a straight outer edge configured for guiding a peripheral edge of the saw housing, and means for releasably clamping the guide bar to a workpiece to be sawed; and
   a gauge device including a measuring tool having a straight side and a light beam projector mounted on the measuring tool at a position spaced from the straight side for projecting a beam of light parallel to the straight side, whereby the gauge device can be positioned with the straight side against the straight outer edge of the guide bar in a position in which the beam projector projects a beam of light along a surface of a flat workpiece.

5. The set of claim 4, further comprising means for adjusting the spacing between the beam projector and the straight side of the measuring tool.

6. The set of claim 4, wherein the light beam projector is a laser.

* * * * *